US010208872B2

(12) United States Patent
Bian et al.

(10) Patent No.: US 10,208,872 B2
(45) Date of Patent: Feb. 19, 2019

(54) VALVE-ACTUATING DEVICE AND METHOD OF SWITCHING OVER A VALVE ARRANGEMENT

(71) Applicant: Neoperl GmbH, Mullheim (DE)

(72) Inventors: Yichao Bian, Monheim am Rhein (DE);
Martin Fangmeier, Auggen (DE);
Matthias Hauth,
Todtnau-Muggenbrunn (DE)

(73) Assignee: Neoperl GmbH, Müllheim (DE)

( * ) Notice: Subject to any disclaimer, the term of this patent is extended or adjusted under 35 U.S.C. 154(b) by 0 days.

(21) Appl. No.: 15/602,297

(22) Filed: May 23, 2017

(65) Prior Publication Data

US 2017/0343127 A1    Nov. 30, 2017

(30) Foreign Application Priority Data

May 24, 2016  (DE) .................... 20 2016 003 311 U

(51) Int. Cl.
| | |
|---|---|
| *F16K 31/12* | (2006.01) |
| *F16K 31/385* | (2006.01) |
| *F16K 31/40* | (2006.01) |
| *F16K 11/044* | (2006.01) |
| *E03C 1/02* | (2006.01) |
| *E03C 1/04* | (2006.01) |

(52) U.S. Cl.
CPC .............. *F16K 31/12* (2013.01); *E03C 1/023* (2013.01); *E03C 1/04* (2013.01); *F16K 11/0445* (2013.01); *F16K 31/3855* (2013.01); *F16K 31/404* (2013.01); *E03C 2201/30* (2013.01)

(58) Field of Classification Search
CPC ........... F16K 11/0445; Y10T 137/7761; Y10T 137/7762; Y10T 137/7764; Y10T 137/7765; Y10T 137/2685; Y10T 137/87877; Y10T 137/87893; B05B 1/1618
USPC .......... 137/119.05, 861, 863, 869, 883, 885; 251/31, 38
See application file for complete search history.

(56) References Cited

U.S. PATENT DOCUMENTS

| | | | | |
|---|---|---|---|---|
| 2,768,791 A | * | 10/1956 | Frey Edward J ..... | D06F 39/088 137/625.4 |
| 3,181,790 A | * | 5/1965 | Smith Thomas R ........................ | D06F 39/045 137/607 |
| 4,955,535 A | * | 9/1990 | Tsutsui ............... | G05D 23/1393 137/606 |

(Continued)

FOREIGN PATENT DOCUMENTS

| | | |
|---|---|---|
| DE | 202011101289 | 10/2012 |
| DE | 102016001975.1 | 1/2016 |
| FR | 2481404 | 10/1981 |

*Primary Examiner* — Matthew W Jellett
(74) *Attorney, Agent, or Firm* — Volpe and Koenig, P.C.

(57) ABSTRACT

In the case of a valve-actuating device (1) having a first valve (3) and a second valve (38), it is provided to form, on the first valve (3), a pressure chamber (14), which can be filled with a pressure from a first inflow (16) via a filling opening (15), wherein the first valve (3) separates the first inflow (16), in a closed position, from a first outflow (19), and wherein the pressure chamber (14) can be emptied into the first outflow (19) via an outflow opening (18), and the outflow opening (18) can be opened and closed by a closure element which can be activated by an operating element (2).

17 Claims, 4 Drawing Sheets

(56) References Cited

U.S. PATENT DOCUMENTS

Figure 1:
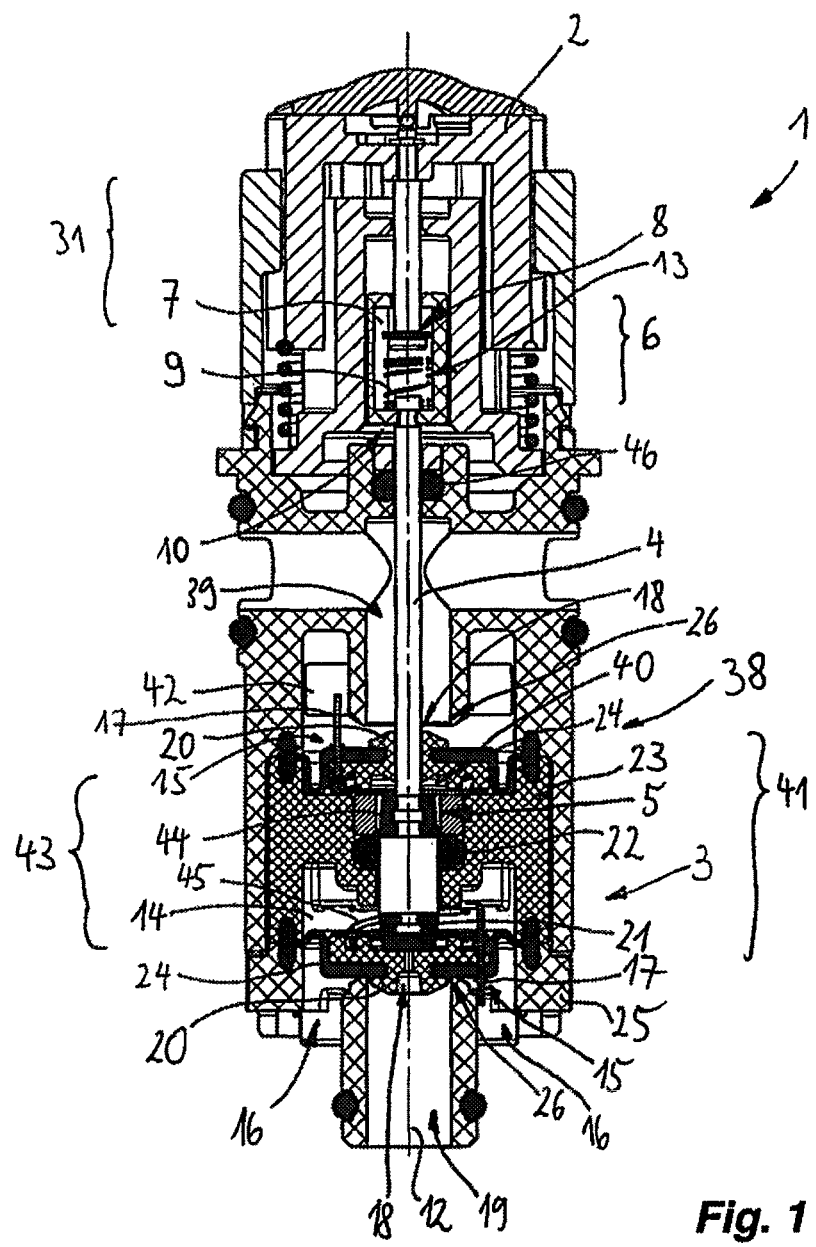

| | | | | | |
|---|---|---|---|---|---|
| 4,967,794 | A | * | 11/1990 | Tsutsui | G05D 23/1393 137/597 |
| 4,971,106 | A | * | 11/1990 | Tsutsui | G05D 23/1393 137/597 |
| 5,085,399 | A | * | 2/1992 | Tsutsui | G05D 23/1393 251/129.06 |
| 5,095,944 | A | * | 3/1992 | Hochstrasser | F16K 11/18 137/595 |
| 5,204,999 | A | * | 4/1993 | Makita | E03D 5/00 4/300 |
| 5,335,696 | A | * | 8/1994 | McKenzie | F16K 7/126 137/863 |
| 5,758,863 | A | * | 6/1998 | Buffet | F16K 31/086 251/28 |
| 7,296,593 | B2 | * | 11/2007 | Matsui | E03C 1/04 137/597 |
| 9,010,372 | B2 | | 4/2015 | Fangmeier | |

\* cited by examiner

VALVE-ACTUATING DEVICE AND METHOD OF SWITCHING OVER A VALVE ARRANGEMENT

INCORPORATION BY REFERENCE

The following documents are incorporated herein by reference as if fully set forth: German Patent Application No. 20 2016 003 311.6, filed May 24, 2016.

BACKGROUND

The invention relates to a valve-actuating device having an operating element and a valve arrangement, which can be actuated by the operating element, wherein the valve arrangement has a first valve, by which a first inflow, in a closed position, can be separated from a first outflow and, in an open position, can be connected to the first outflow, and a second valve, by which a second inflow, in a closed position, can be separated from a second outflow and, in an open position, can be connected to the second outflow, wherein a switchover device, which can be actuated by the operating element, is designed to transfer in opposite directions the first valve from the closed position into the open position and the second valve from the open position into the closed position, and vice versa.

Such valve-actuating devices are known, for example, in the case of diverters, in which a joint inflow can be optionally connected to a first outflow or a second outflow. For example, this setup is used in sanitary outlet fittings in which it is possible to switch over between an outflow which opens out into a fixed outlet, for example in a bathtub, and an outflow which opens out into a shower attachment.

The invention also relates to a method of switching over a valve arrangement.

SUMMARY

The invention is based on the object of improving the switching behavior of a valve-actuating device.

The aforementioned object is achieved using one or more features of the invention. In particular, in order to achieve the object in the case of a valve-actuating device of the type described in the introduction, the invention therefore provides that at least the first valve should have a pressure chamber, which is connected to the first inflow via a filling opening and can be connected to the first outflow via an outflow opening, wherein the pressure chamber can act on a valve element of the first valve, said valve element separating the first outflow from the first inflow, and wherein the outflow opening can be opened and closed by a closure element which is in operative connection with the operating element. The fact that the invention makes use of a pressure chamber with an activatable outflow opening means that it is possible to have a smoother transition from a closed state at the valve element to an open state, and/or vice versa. A force required for opening the valve, rather than having to be introduced entirely via the operating element, can be developed, for example at least in part, by a water pressure which is present at the inflow and is imparted to the pressure chamber via the filling opening. It is likewise the case that a force required for closing the valve, rather than having to be introduced entirely via the operating element, can be developed, for example at least in part, by a water pressure which is present at the inflow and acts on the valve element.

In the case of one configuration of the invention, provision may be made for the valve element of the first valve to be fitted on an elastic membrane. This makes it possible to form a pressure chamber of variable volume. The membrane preferably bears the filling opening of the pressure chamber of the first valve. The filling opening can thus be moved along as well when the valve is moved. This provides for straightforward self-cleaning of the filling opening for example with a cleaning spring. It is particularly advantageous if the filling opening is formed on the valve element. Additional parts on the membrane can thus be dispensed with, and it is possible to achieve a straightforward construction in design terms.

In the case of one configuration of the invention, provision may be made for the outflow opening of the first valve to be larger than the filling opening of the first valve. This makes it possible to achieve a decrease in pressure in the pressure chamber without the filling opening having to be closed. It is thus possible to achieve automatic opening of the valve, which can be assisted by a water pressure being present at the inflow.

In the case of one configuration of the invention, provision may be made for the pressure chamber to be a first pressure chamber and for the second valve to have a second pressure chamber, which can be connected to the second inflow via a filling opening and to the second outflow via an outflow opening, wherein the second pressure chamber can act on a valve element of the second valve, said valve element separating the second outflow from the second inflow, and wherein the outflow opening of the second valve can be opened and closed by a closure element, for example the one already mentioned or a separate one, which is in operative connection with the operating element. This makes it possible to achieve a smooth or a servo-adjusted changeover between the valve positions at the two valves. The two valves can be activated by a joint closure element. This makes it possible to simplify the construction in design terms and the operation.

In the case of one configuration of the invention, provision may be made for the valve element of the second valve to be fitted on an elastic membrane. This means that closing and opening of the second valve can easily be controlled by a pressure-controlled variation in a volume in a second pressure chamber. The membrane preferably includes a filling opening, for example the one already mentioned, of a pressure chamber, for example the one already mentioned, of the second valve. The filling opening can thus be moved along as well when the valve is actuated. This simplifies self-cleaning of the filling opening, for example along a preferably fixed cleaning pin, which penetrates into the filling opening in dependence on the adjustment position of the second valve.

In the case of one configuration of the invention, provision may be made for the closure elements to be capable of being adjusted between a first position, in which the valve element of the first valve is pushed into a valve seat of the first valve, and a second position, in which the valve element of the second valve is pushed into a valve seat of the second valve. An adjustment path of the closure element can thus be predetermined by way of the closed positions of the valves. The closure element can thus affect a changeover by switching over the valves.

In the case of one configuration of the invention, provision may be made for the first inflow and the second inflow to be connected to one another. This makes it possible to change over a water flow from the joint inflow into one of the two outflows.

In the case of one configuration of the invention, provision may be made for the first inflow and the second inflow to be routed separately from one another. As a result, the first inflow and the second inflow are routed without being connected to one another or in a connection-free manner. It is thus possible to switch alternately between separate flows.

In the case of one configuration of the invention, provision may be made for the outflow opening of the second valve to be larger than the filling opening of the second valve. As a result—in a manner analogous to the first valve—the second pressure chamber empties, as the outflow opening of the second valve opens, and a pressure in the second pressure chamber decreases. This makes it possible for the second valve to be opened with only a small amount of force being applied.

In the case of one configuration of the invention, provision may be made for the switchover device to be arranged, in spatial terms, between the first valve and the second valve. This makes it possible to achieve small external dimensioning in a direction transverse to an actuating direction of the switchover device.

In the case of one configuration of the invention, provision may be made for the first pressure chamber to be sealed in relation to the second pressure chamber by a seal. This makes it possible to achieve movement capability of the closure element relative to the pressure chambers while, at the same time, the pressure chambers are separated. An internal pressure can thus be adjusted separately for each pressure chamber. This allows time-staggered, preferably later, opening of one of the two valves relative to closure of the respectively other one of the two valves. This means that loading of a connected pipe system, for example as a result of rebound action as a valve closes, can be reduced. The seal is preferably arranged between the closure elements of the valves or butts against a (joint) closure element.

In the case of one configuration of the invention, provision may be made for the valve elements and/or membranes of the first valve and of the second valve to be arranged and/or designed with point symmetry or mirror symmetry in relation to one another in each case. This makes it possible to achieve a straightforward construction in design terms. It is thus readily possible to achieve the situation where the two valves have essentially equal or even identical switching behaviors. This further enhances the ease of operation.

In the case of one configuration of the invention, provision may be made for a control element to be in operative connection with the operating element, wherein the valve arrangement can be actuated by a distal end of the control element. An actuating force can thus be introduced straightforwardly. The control element is preferably of rod-like design. This provides for a particularly compact construction and/or space-saving transmission of actuating forces into the valve arrangement.

In the case of one configuration of the invention, provision may be made for the control element to be guided in a movable manner through a valve element, for example the already mentioned valve element, of the first valve or of the second valve. This makes it possible to achieve movement capability of the relevant valve in relation to the control element without additional installation space having to be used for the control element. An adjustment position of the relevant valve can thus be isolated from the control element. The control element is preferably guided in a displaceable manner. This simplifies sealing between the relevant valve element and the control element or creates an outflow opening for pressure-relief purposes. This, in turn, is advantageous for a controlled build up of pressure in the associated pressure chamber.

In the case of one configuration of the invention, provision may be made for the control element to be arranged, at least in part, in the first or second outflow. This makes it possible for the control element to be routed to the valves in a straightforward manner in design terms. The control element is preferably arranged, at least in part, in that outflow of which the associated valve elements is arranged in a movable manner on the control element. Pressure can therefore be relieved directly into the outflow.

In the case of one configuration of the invention, provision may be made for the closure element to be formed on the control element, in particular at the distal end thereof. This means that the already mentioned closure element can be activated straightforwardly, for example by way of an alteration of position in a pressure chamber or in both pressure chambers. The first closure element of the first valve and the second closure element of the second valve are preferably formed on a joint control element, in particular are connected rigidly to one another or are in the form of a joint closure element.

In the case of one configuration of the invention, provision may be made for a compensating device to be arranged in operative connection between a control element, for example the one already mentioned which actuates the valve arrangement, and the operating element, said compensating device having a push rod, guided in a movable manner in a mount, and allowing the operating element to move relative to the control element. Therefore, an adjustment path of the operating element can be designed to be different from an adjustment path of the control element, in particular to be greater than the latter adjustment path. An actuating movement of the operating element can thus be isolated, in part, from a corresponding movement of a closure element, for example the one already mentioned, for example in order for the operating element to be restored into a starting position. It is preferable for a restoring element to be present, said restoring element counteracting the relative movement by a restoring force. It is therefore readily possible for the control element to be guided along with the operating element as far as a stop or resistance element for the control element. For example, use can be made of a compensating device like that in German patent application No. 10 2016 001 975.1, the content of which is included in full in the present description.

In the case of one configuration of the invention, provision may be made for the operating element to be subjected to the action of an operating-element restoring spring. This means that the operating element can be readily restored into a starting position. Provision may be made here for the operating-element restoring spring to develop a greater force than a restoring element, for example the one already mentioned, of a compensating device, for example the one already mentioned. It is thus possible to establish an operative connection between the operating element and the control element for example in the already mentioned starting position. As an alternative, or in addition, provision may be made for the operating-element restoring spring to be designed in the form of a helical spring. This provides for a space-saving arrangement of the compensating device and/or of parts of the control element within the operating-element restoring spring. The operating-element restoring spring can thus engage around a control element, for example the control element already mentioned, and/or the compensating device. The operating-element restoring spring is preferably supported on a housing part. This provides for a defined starting position of the operating element in relation to the housing part.

In the case of one configuration of the invention, provision may be made for the operating element to be connected to a bi-stable adjustment mechanism. This means that a starting position of the operating element can be rendered independent of a particular adjustment position of the valve arrangement at any one time. For example, the adjustment mechanism may be designed in the form of a push/push locking mechanism, in particular of a ballpoint-pen mechanism and/or of a cardioid mechanism. This allows straightforward actuation and straightforward changeover between the positions, since all a user has to do is to achieve the changeover is to apply pressure.

In the case of one configuration of the invention, provision may be made for the operating element to be designed in the form of a manual operating element. This provides for direct manual actuation. It is also possible, however, for the operating element to be coupled or operatively connected to a for example remotely arranged manual operating element. Remote actuation is thus possible. As an alternative, or in addition, provision may be made for the operating element to be coupled, in the form of a motor-adjustable, preferably electromotive-adjustable, operating element, to a drive. It is thus possible for the operating element to be drivable by a motor and possibly, in addition, manually. For example, the operating element can be connected, in particular coupled, directly or indirectly to a for example electric drive. Actuation from a distance is thus also possible.

As an alternative, or in addition, the aforementioned object of the invention is achieved by the features of the additional independent claim, which is directed to a method. In particular, in order to achieve the object in the case of a method of the type mentioned in the introduction, it is therefore provided that the valve arrangement should have a first valve, with a first pressure chamber, and a second valve, wherein the first pressure chamber is connected to a first inflow of the first valve via a filling opening and can be connected to a first outflow of the first valve via an outflow opening, wherein in the first instance the outflow opening of the first valve is closed, and therefore a pressure built up in the first pressure chamber closes the first valve, and the second valve is open, and wherein, upon closure of the second valve, the outflow opening of the first valve is opened, and therefore the pressure built up in the first pressure chamber decreases and the first valve is released. It is therefore possible to achieve soft closure of the first valve, and opening of the first valve can be affected in a pressure-assisted manner with a reduced actuating force.

In the case of one configuration of the invention, provision may be made for the second valve to have a second pressure chamber, which is connected to a second inflow of the second valve via a filling opening and can be connected to a second outflow of the second valve via an outflow opening, and, upon the already mentioned closure of the second valve, for the outflow opening of the second valve to be closed, and therefore the pressure which builds up in the second chamber is one which closes the second valve. This means that the switching behavior which has already been described in relation to the first valve can also be achieved for the second valve and, in particular, at a predetermined time interval in relation to the first valve or independently of the procedures implemented at the first valve. Switching at the first valve can thus take place at the same time, or more or less at the same time, as switching at the second valve, for example such that a user cannot distinguish between the two switching operations and/or it is not possible to distinguish between a time sequence of the switching operations.

In the case of one configuration of the invention, provision may be made to use a valve-actuating device according to the invention, in particular as described above and/or in accordance with one of the claims directed to a valve-actuating device. This makes it possible to achieve a particularly advantageous implementation of the method according to the invention, which can achieve at least the above-described advantages of the valve-actuating device according to the invention.

BRIEF DESCRIPTION OF THE SEVERAL
VIEWS OF THE DRAWINGS

The invention will now be explained in more detail with reference to advantageous exemplary embodiments, although it is not limited to these exemplary embodiments. Further exemplary embodiments can be gathered by combining the features of one or more claims with one another and/or with one or more features of the exemplary embodiments.

Figure 2:
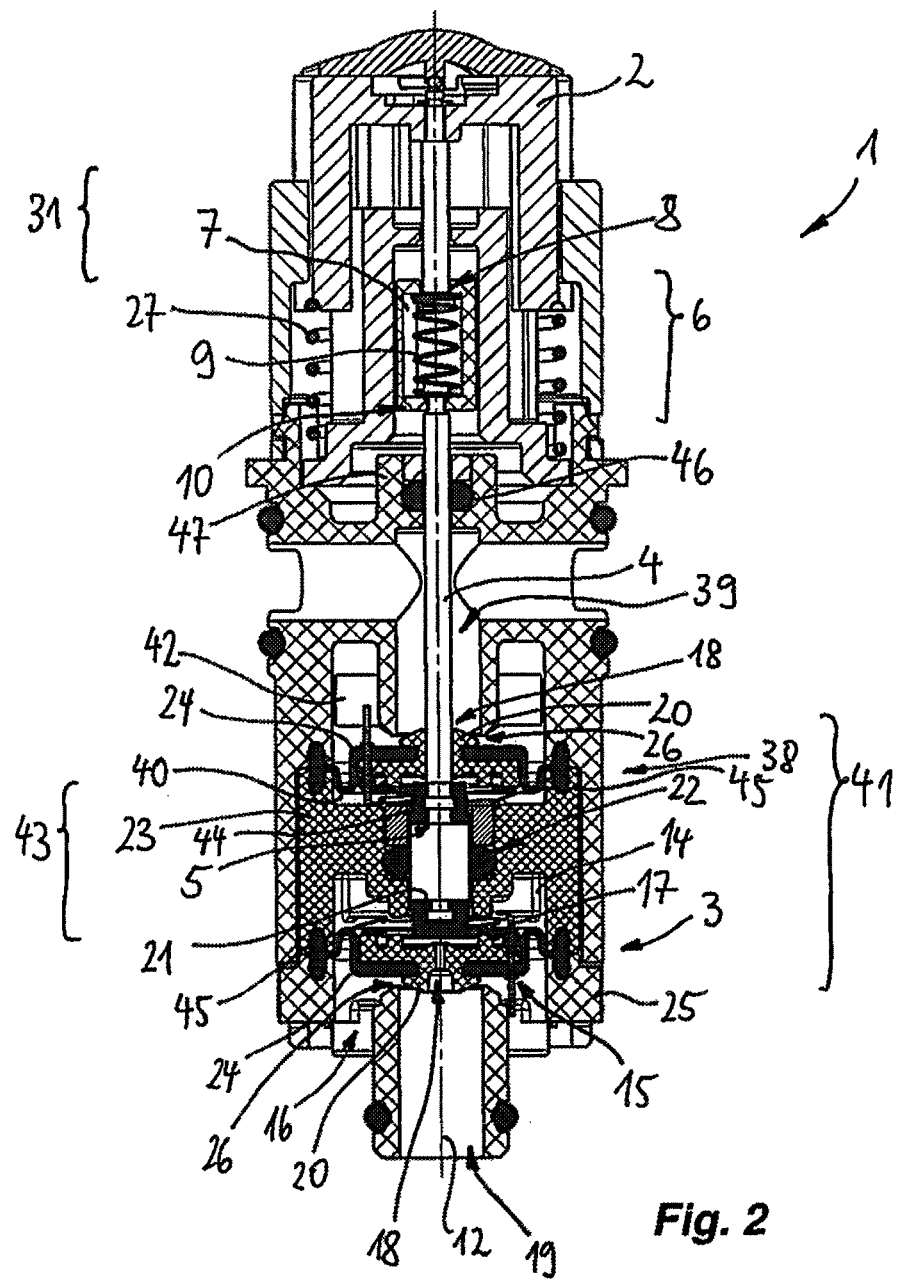
Figure 3:
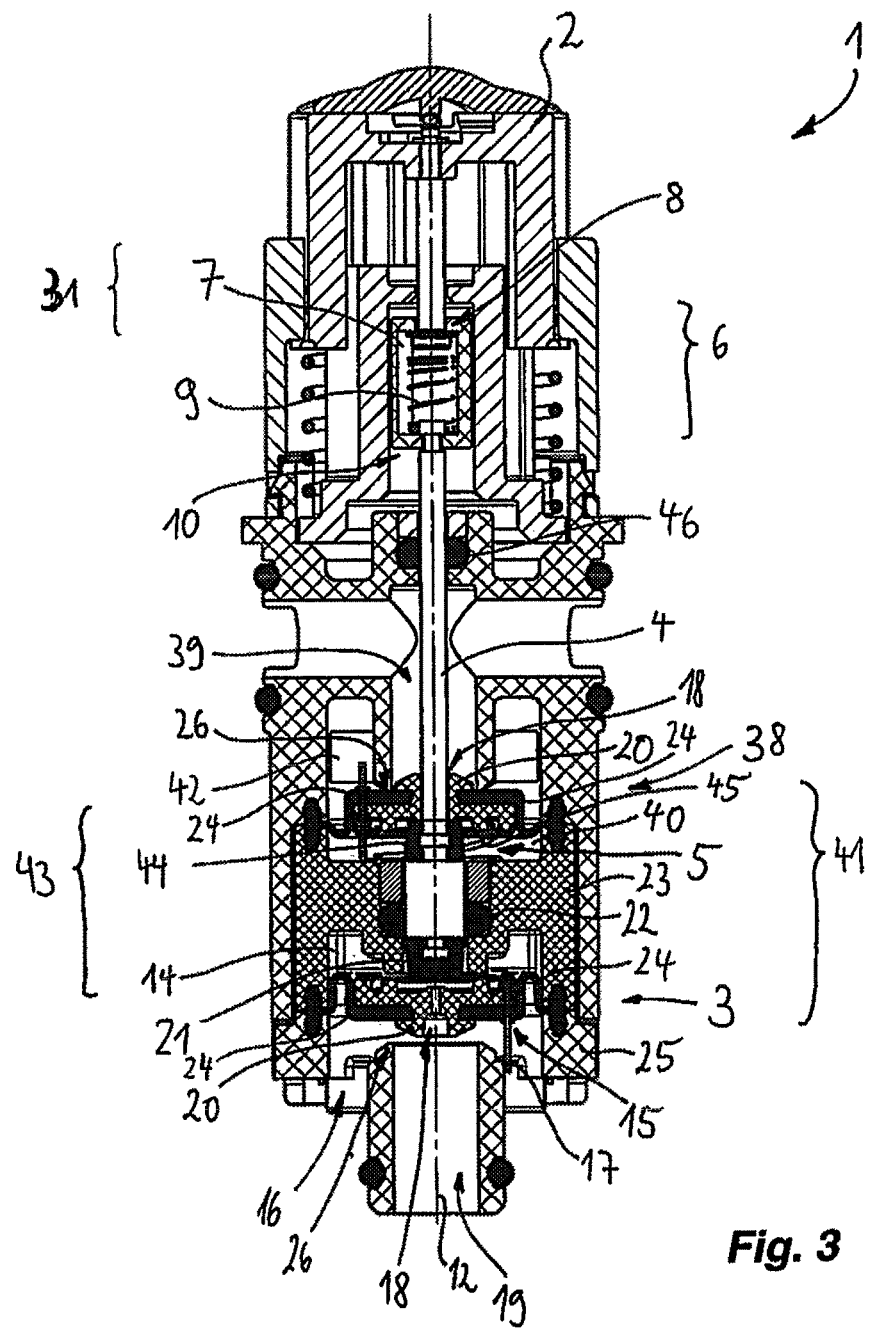
Figure 5:
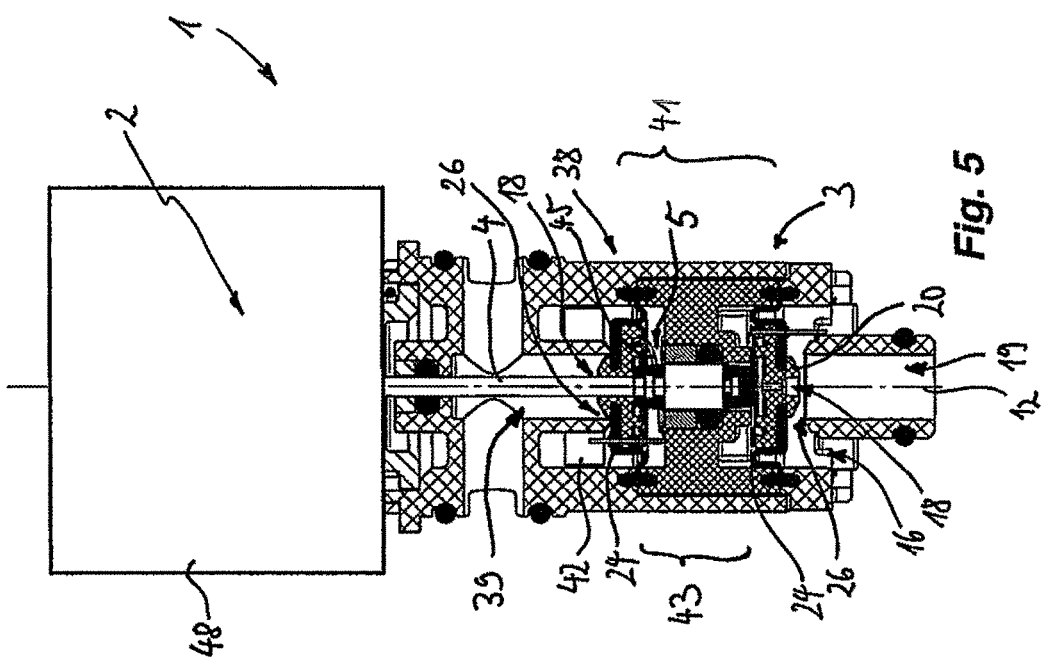
Figure 4:
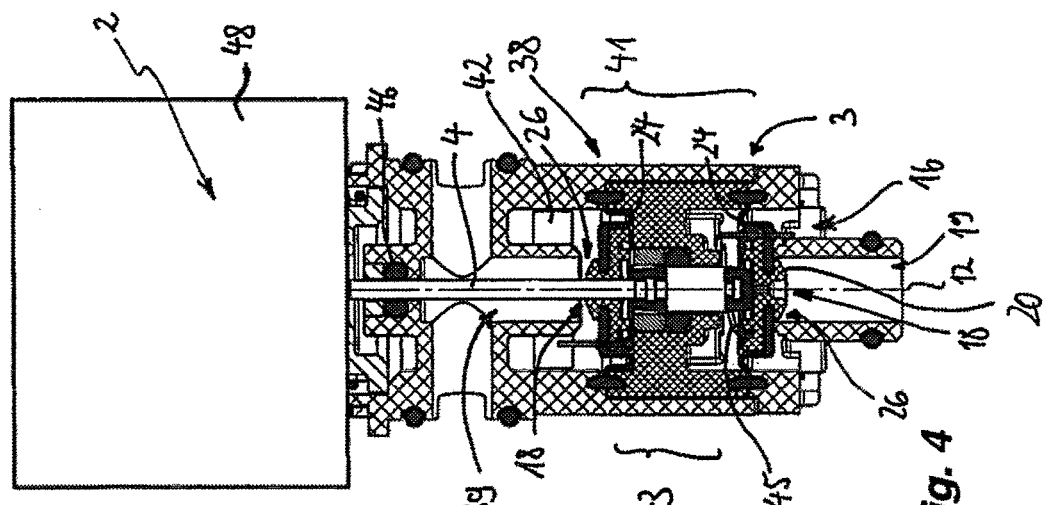

In the drawings:

FIG. 1 shows a longitudinal section through a valve-actuating device according to the invention, wherein an operating element is arranged in a lower rest position, in which an outflow opening of a first valve is closed and a second outflow opening of a second valve is open, FIG. 2 shows the valve-actuating arrangement according to FIG. 1 in an intermediate position of a switchover operation, in which the two outflow openings are open, FIG. 3 shows the valve-actuating device according to FIG. 1, wherein an operating element is arranged in an upper rest position, in which the outflow opening of the first valve is open and the second outflow opening of the second valve is closed, FIG. 4 shows a further valve-actuating device according to the invention, in the case of which an actuating element is coupled to a drive, in a first switching position, and FIG. 5 shows the valve-actuating device according to FIG. 4 in a second switching position.

DETAILED DESCRIPTION OF THE
PREFERRED EMBODIMENTS

FIGS. 1 to 3 show different switching states or switching positions of a valve-actuating device designated as a whole by 1, and will therefore be described together hereinbelow.

The valve-actuating device 1 has an operating element 2—in this case designed, by way of example, in the form of a manual operating element—by which a valve arrangement 41 can be actuated.

The valve arrangement 41 here has a first valve 3, which can be opened and closed.

FIGS. 1 and 2 here show the first valve 3 in the closed state, that is to say in the closed position, whereas FIG. 3 illustrates said first valve 3 in the open state, that is to say the open position.

By use of the first valve 3, a first inflow 16 can therefore be separated from a first outflow 19 and connected to the first outflow 19.

The valve arrangement 41 also has a second valve 38, by which a second inflow 42 can be separated from a second outflow 39 when the second valve 38 is closed. The closed position of said second valve 38 is shown in FIGS. 2 and 3.

The second inflow 42 can be connected to the second outflow 39 by the second valve 38 being transferred into its open position, as FIG. 1 shows.

A switchover device 43, which will be described in more detail hereinbelow, can thus be used to switch over the valve arrangement 41 between a state according to FIG. 1, in which the first valve 3 is closed and the second valve 38 is open, and a state according to FIG. 3, in which the first valve is open and the second valve 38 is closed.

The switchover device 43 thus provides for transfer in opposite directions of the first valve 3 from the closed position into the open position and of the second valve 38 from the open position into the closed position, and vice versa.

The first valve 3 has a pressure chamber 14, which is connected to the first inflow 16 via a filling opening 15.

This means that a pressure which is present in the inflow 16 can be transferred into the pressure chamber 14 of the first valve 3 via the filling opening 15.

The first valve 3 also has formed on it an outflow opening 18, via which the pressure chamber 14 can be connected to the first outflow 19, as will be explained in yet more detail hereinbelow.

The first valve 3 also has a valve element 20, by which the outflow 19 can be closed in relation to the first inflow 16.

This valve element 20 can be subjected to the action of an internal pressure in the pressure chamber 14 of the first valve 3, in order to separate off the first inflow 16.

The outflow opening 18 of the first valve 3 can be closed and opened or released by a closure element 21. The closure element 21 here is in operative connection with the operating element 2, and therefore the outflow opening 18 can be closed or released by way of suitable actuation of the operating element 2.

The first valve 3 also has an elastic membrane 24, which is mounted between a first housing part 23 and a second or further housing part 25. The valve element 20 of the first valve 3 is fitted on the membrane 24. An internal pressure in the pressure chamber 14 therefore moves the valve element 20 in the direction of a valve seat 26 of the first valve 3 or away from the same. Since the internal pressure in the pressure chamber 14 displaces the membrane 24, the position of the first valve can therefore be controlled by pressure in the pressure chamber 14 being altered.

The already mentioned filling opening 15 is formed on the valve element 20 and therefore the filling opening 15 is moved along with the membrane 24. A cleaning pin 17 penetrates the filling opening 15 without closing it. The movement for opening and closing the first valve 3 causes the cleaning pin 17 to clean the filling opening 15, and so the latter cannot clog up.

The cleaning pin 17 here is seated on a spring 45, which is secured on the valve element 20.

Since the outflow opening 18 in the valve element 20 of the first valve 3 has a larger cross-sectional surface area than the filling opening 15 of the first valve 3, there is a reduction in internal pressure in the pressure chamber 14 as soon as the outflow opening 18 is opened by the closure element 21.

On the other hand, the first valve 3 will close as soon as the operating element 2 activates the closure element 21 to close the outflow opening 18. This is because a water pressure at the inflow 16 will then result, via the filling opening 15, in a buildup of pressure in the pressure chamber 14. This buildup of pressure will ensure that the valve element 20 is pushed into the valve seat 26. This closes the first valve 3.

As soon as the closure element 21 is removed from the outflow opening 18 by actuation of the operating element 2, the pressure in the pressure chamber 14 decreases and, as result of the water pressure in the first inflow 16, the valve element 20 with the membrane 24 is detached from the valve seat 26, the first valve 3 thus opening.

The second valve 38 has, in the same way, a second pressure chamber 40, which is likewise connected to a second inflow 42 via a filling opening 15. In an analogous manner, it is also the case that the second valve 38 has an outflow opening 18, via which the second pressure chamber 40 can be emptied into a second outflow 39. The outflow opening 18 here is designed in the form of an annular gap, which is formed between the valve element 20 and the second valve 38 and the control element 4 guided through the valve element 20.

The functioning of the second valve 38 is analogous to the functioning of the first valve 3, for which reason components and functional units which are the same or identical in functional and/or design terms for the two valves 3, 38 are designated by the same reference signs and are not described separately. What has been said in relation to the first valve 3 therefore applies correspondingly to the second valve 38.

Here too, therefore, the distal end 5 of the control element 4 has formed on it a closure element 44, which can open and close the outflow opening 18 of the second valve 38 in order to make it possible optionally to decrease or build up an internal pressure in the second pressure chamber 40. When the pressure in the second pressure chamber 40 has been built up, the second valve 38 is closed, since the associated valve element 20 is then pushed into the valve seat 26 of the second outflow 39. When the outflow opening 18 of the second valve 38 is open, in contrast, an internal pressure in the second pressure chamber 40 is decreased, and therefore a water pressure in the second inflow 42 moves the valve element 20 away from said valve seat 26. The second valve 38 is thus opened.

The closure element 21 of the first valve 3 and the closure element 44 of the second valve 38 are connected rigidly to one another and are formed at the distal end 5 of the control element 4. It is also possible for the closure elements 21, 44 to be designed in the form of a joint closure element.

In the case of the valve-actuating device 1 of FIGS. 1 to 3, the first inflow 16 and the second inflow 42 are connected to one another to form a joint inflow for the two valves 3, 38.

A changeover between the position according to FIG. 1 and the position according to FIG. 3 can thus achieve switchover from the joint inflow to one of the two outflows 19, 39.

The switchover device 43 here is arranged between the first valve 3 and the second valve 38.

A seal 22 here seals the first pressure chamber 14 in relation to the second pressure chamber 40.

Overall, the second valve 38 is identical to the first valve 3 and, in particular, is designed with point symmetry in relation to a center point of the seal 22, which is designed in the form of an O ring.

The operative connection between the operating element 2 and the switchover device 43 is established by the rod-like control element 4 which has already been mentioned.

Starting from its distal end 5, at which the closure elements 21 and 44 are formed, the control element 4 is guided through the valve element 20 of the second valve 38. The valve element 20 of the second valve 38 here is mounted in a displaceable manner on said control element 4, and therefore a movement of the control element 4 is isolated from a movement of the valve element 20 of the second valve 38.

After it has passed through the valve element 20 of the second valve 38, the control element 4 runs in the second outflow 39 and exits from the second outflow 39 through a further seal 46.

At its proximal end 10, the control element 4 is coupled to a compensating device 6.

The compensating device 6 is located in the operative connection between the operating element 2 and the control element 4 and ensures that the operating element 2 is not obstructed by the closure element 21 stopping against the valve element 20 of the first valve 3. For this purpose, the compensating device 6 has a push rod 8, which is arranged in a mount 7 such that it can be displaced in relation to a restoring force of a restoring element 9.

It can be seen in FIGS. 1 to 3 that the mount 7 is formed in a non-displaceable manner at the proximal end 10 of the control element 4, that the restoring element 9 is arranged in the mount 7, and that the push rod 8 is fixed on the operating element 2.

In the case of further exemplary embodiments, the compensating device 6 may also be realized by the push rod 8 being formed at the proximal end 10 of the control element 4, while the mount 7 is fixed to the operating element 2 and can be moved along therewith by being coupled rigidly thereto.

In the case of further exemplary embodiments, and in particular when the push rod 8 is formed on the control element 4, the restoring element 9 may be formed outside the mount 7. In particular it is possible here for the restoring element 9, that is to say the helical spring illustrated, to be positioned on the control element 4, so as to be supported by the housing part 47.

The operating element 2, in addition, is subjected to the action of an operating-element restoring spring 27, which is supported at least indirectly on the housing part 47.

The restoring force of said operating-element restoring spring 27 is greater than the restoring force of the restoring element 9.

The operating-element restoring spring 27 is designed in the form of a helical spring and engages around the compensating device 6 and parts of the control element 4, in particular the proximal end 10 of the latter.

The operating element 2 is provided with a bi-stable adjustment mechanism 31 (not illustrated in any further detail). This bi-stable adjustment mechanism 31 is designed in a manner known per se in the form of a push/push locking mechanism, for example of a ballpoint-pen mechanism or of a cardioid mechanism. The bi-stable adjustment mechanism 31 thus makes it possible for a changeover between the switching position according to FIG. 1 and the switching position according to FIG. 3 and back to be achievable by pressure being applied to the operating element 2 along the longitudinal axis 12 of the valve-actuating device 1.

It should also be mentioned that the push rod 8 can be removed from the mount 7 via a push-rod removal opening 13, which in FIG. 1 is formed above the section plane illustrated, in order for the compensating device 6 to be dismounted or conversely, by virtue of the push rod 8 being introduced, mounted.

During operation of the valve-actuation device 1, the switchover of the valve arrangement 41 is achieved in that in the first instance, for example in the switching state according to FIG. 1, the first pressure chamber 14 is connected to the joint inflow 16, 42 via the already described filling opening 15 of the first valve 3, wherein in the first instance the outflow opening 18 of the first valve 3 is closed. The pressure imparted from the joint inflow 16, 42 in the first pressure chamber 14 closes the first valve 3 in the manner described. In contrast, in the switching position according to FIG. 1, the second valve 38 is open, since the action of the outflow opening 18 being opened empties the second pressure chamber 40 via the outflow opening 18 of the second valve 38.

For the purpose of closing the second valve 38, then, the outflow opening 18 of the second valve 38 is closed in that, by virtue of pressure being applied to the operating element 2 and of the following return movement by way of the operating-element restoring spring 27, the upper closure element 44 closes the outflow opening 18 of the second valve 38 and, at the same time, releases the outflow opening 18 of the first valve 3.

This then gives rise to a pressure building up in the second pressure chamber 40, as result of which the valve element 20 of the second valve 38 is pushed into the valve seat 26 at the second outflow 39. This closes the second valve 38.

This therefore gives rise briefly to a transition position according to FIG. 2. FIG. 2 therefore shows clearly that the changeover from the second outflow 39 to the first outflow 19 takes place in two steps which proceed more or less at the same time or independently of one another: on the one hand, the second outflow 39 is closed; on the other hand, the first outflow 19 is opened.

At the same time, in FIG. 2, the pressure in the first pressure chamber 14 is decreased via the outflow opening 18 of the first valve 3, and therefore the valve element 20 with the membrane 24 of the first valve 3 is pushed out of the valve seat 26 at the first outflow 19 as result of the pressure in the inflow 16. This opens the first valve 3, and therefore the situation according to FIG. 3 is present at the end of the switchover operation.

FIG. 4 and FIG. 5 show a further valve-actuating device 1 according to the invention. Components and functional units which are the same or identical in design and/or functional terms to components or functional units of the exemplary embodiment above are illustrated in a corresponding manner and/or are designated by the same reference signs and are not described separately again. What has been said in relation to FIGS. 1 to 3 thus applies correspondingly to FIG. 4 and FIG. 5.

FIG. 4 shows the valve-actuating device 1 in a switching position in which the first valve 3 is closed and the second valve 38 is open. In FIG. 5, in contrast, the first valve 3 is open and the second valve 38 is closed.

The exemplary embodiment according to FIGS. 4 and 5 differs from the exemplary embodiment according to FIGS. 1 to 3 in that the operating element 2 (not illustrated in any further detail) is coupled to a drive 48, and therefore the control element 4 is motor-adjustable. The operating element 2 may be, for example, an actuator of the drive 48 which is known per se.

Beneath the drive 48, the valve arrangement 1 is designed in a manner corresponding to FIGS. 1 to 3, and therefore repetition will be avoided by referring to what has been said in relation to said figures.

In the case of the valve-actuating device 1 having a first valve 3 and a second valve 38, the invention thus proposes to form, on the first valve 3, a pressure chamber 14, which can be filled with a pressure from a first inflow 16 via a filling opening 15, wherein the first valve 3 separates the first inflow 16, in a closed position, from a first outflow 19, and wherein the pressure chamber 14 can be emptied into the first outflow 19 via an outflow opening 18, and the outflow opening 18 can be opened and closed by a closure element 21 which can be activated by an operating element 2.

LIST OF REFERENCE SIGNS

1 Valve-actuating device
2 Operating element
3 (First) valve
4 Control element
5 Distal end
6 Compensating device
7 Mount
8 Push rod
9 Restoring element
10 Proximal end
12 Longitudinal axis
13 Push-rod removal opening
14 (First) pressure chamber
15 Filling opening
16 (First) inflow
17 Cleaning pin
18 Outflow opening
19 (First) outflow
20 Valve element
21 (First) closure element
22 Seal
23 Housing part
24 Membrane
25 Further housing part
26 Valve seat
27 Operating-element restoring spring
31 Bi-stable adjustment mechanism
38 (Second) valve
39 (Second) outflow
40 (Second) pressure chamber
41 Valve arrangement
42 (Second) inflow
43 Switchover device
44 (Second) closure element
45 Spring
46 Further seal
47 Housing part
48 Drive

The invention claimed is:

1. A valve-actuating device (1) comprising an operating element (2) and a valve arrangement (41), which is actuatable by the operating element (2), the valve arrangement (41) includes a first valve (3) which in a first valve closed position separates a first inflow (16) from a first outflow (19) and, in a first valve open position, connects the first inflow (16) to the first outflow (19), and a second valve (38) which in a second valve closed position separates a second inflow (42) from a second outflow (39) and, in a second valve open position, connects the second inflow (39) to the second outflow (39), a switchover device (43), which is actuatable by the operating element (2), is designed to transfer in opposite directions the first valve (3) from the first valve closed position into the first valve open position and the second valve (38) from the second valve open position into the second valve closed position, and vice versa, at least the first valve (3) includes a first pressure chamber (14), which is connected to the first inflow (16) via a first filling opening (15) and is connectable to the first outflow (19) via a first outflow opening (18), the first pressure chamber (14) acts on a first valve element (20) of the first valve (3), said first valve element separating the first outflow (19) from the first inflow (16), and the first outflow opening (18) is openable and closeable by a first closure element (21) which is in operative connection with the operating element (2);

the second valve has a second pressure chamber (40), which is connected to the second inflow (42) via a second filling opening (15) and is connectable to the second outflow (39) via a second outflow opening (18), the second pressure chamber (40) acts on a second valve element (20) of the second valve (38), said second valve element separating the second outflow (39) from the second inflow (42), a second closure element (44) by which the second outflow opening (18) is openable and closeable, the second closure element (44) is in operative connection with the operating element (2); and a control element (4) guided in a movable manner through the valve element (20) of the first valve (3) or of the second valve (38).

2. The valve-actuating device (1) as claimed in claim 1, wherein the first valve element (20) of the first valve (3) is fitted on an elastic membrane (24), which includes the first filling opening (15) of the pressure chamber (14) of the first valve (3).

3. The valve-actuating device (1) as claimed in claim 1, wherein the first outflow opening (18) of the first valve (3) is larger than the first filling opening (15) of the first valve (3).

4. The valve-actuating device (1) as claimed in claim 1, wherein the second valve element (20) of the second valve (38) is fitted on an elastic membrane (24), which includes the second filling opening (15) of the second pressure chamber (40).

5. The valve-actuating device (1) as claimed in claim 1, wherein the second outflow opening (18) of the second valve (38) is larger than the second filling opening (15) of the second valve (38).

6. The valve-actuating device (1) as claimed in claim 1, wherein the first inflow (16) and the second inflow (42) are connected to one another or routed separately from one another.

7. The valve-actuating device (1) as claimed in claim 1, wherein the first pressure chamber (14) is sealed in relation to the second pressure chamber (40) by a seal (22) which butts against the closure element (21, 44), or is arranged between two closure elements (21, 44).

8. The valve-actuating device (1) as claimed in claim 1, wherein a control element (4) is in operative connection with the operating element (2), the valve arrangement (41) is actuated by a distal end (5) of the control element (4).

9. The valve-actuating device (1) as claimed claim 8, wherein the control element (4) is arranged, at least in part, in the first or the second outflow (39) and the closure element (21, 44) is formed on the control element (4).

10. The valve-actuating device (1) as claimed in claim 8, wherein a compensating device (6) is arranged in an operative connection between the control element (4), which actuates the valve arrangement (41), and the operating element (2), said compensating device having a push rod (8), guided in a movable manner in a mount (7), and allowing the operating element (2) to move relative to the control element (4).

11. The valve-actuating device (1) as claimed in claim 1, wherein the operating element (2) is subjected to the action of an operating-element restoring spring (27), which is supported on a housing part (47), and the operating-element restoring spring (27) develops a greater force than a restoring element (9) of a compensating device (6).

12. A valve-actuating device (1) comprising an operating element (2) and a valve arrangement (41), which is actuatable by the operating element (2), the valve arrangement

(41) includes a first valve (3) which in a first valve closed position separates a first inflow (16) from a first outflow (19) and, in a first valve open position, connects the first inflow (16) to the first outflow (19), and a second valve (38) which in a second valve closed position separates a second inflow (42) from a second outflow (39) and, in a second valve open position, connects the second inflow (39) to the second outflow (39), a switchover device (43), which is actuatable by the operating element (2), is designed to transfer in opposite directions the first valve (3) from the first valve closed position into the first valve open position and the second valve (38) from the second valve open position into the second valve closed position, and vice versa, at least the first valve (3) includes a first pressure chamber (14), which is connected to the first inflow (16) via a first filling opening (15) and is connectable to the first outflow (19) via a first outflow opening (18), the first pressure chamber (14) acts on a first valve element (20) of the first valve (3), said first valve element separating the first outflow (19) from the first inflow (16), the first outflow opening (18) is openable and closeable by a first closure element (21) which is in operative connection with the operating element (2), and the operating element (2) is connected to a bi-stable adjustment mechanism (31) formed as a push/push locking mechanism or a cardioid mechanism such that a changeover between the first valve (3) from the first valve closed position into the first valve open position and the second valve (38) from the second valve open position into the second valve closed position, and vice versa, is achievable by pressure being applied to the operating element along a longitudinal axis of the valve-actuating device.

13. The valve-actuating device (1) as claimed in claim 1, wherein the operating element (2) is designed in the form of a manual operating element or is coupled, in the form of a motor-adjustable operating element (2), to a drive (48).

14. The valve-actuating device (1) as claimed in claim 1, wherein the first and second closure elements (21, 44) are adjustable between a first position, in which the first valve element (20) of the first valve (3) is pushed into a valve seat (26) of the first valve (3), and a second position, in which the second valve element (20) of the second valve (38) is pushed into a valve seat (26) of the second valve (38).

15. The valve-actuating device (1) as claimed in claim 1, wherein the switchover device (43) is arranged, in spatial terms, between the first valve (3) and the second valve (38).

16. The valve-actuating device (1) as claimed in claim 1, wherein at least one of the first and second valve elements (20) or membranes (24) of the first valve (3) and of the second valve (38) are at least one of arranged or designed with point symmetry or mirror symmetry in relation to one another in each case.

17. A method of switching over a valve arrangement (41), wherein the valve arrangement (41) has a first valve (3), with a first pressure chamber (14), and a second valve (38), wherein the first pressure chamber (14) is connected to a first inflow (16) of the first valve (3) via a first filling opening (15) and is connectable to a first outflow (19) of the first valve (3) via a first outflow opening (18), the method comprising in the first instance closing the first outflow opening (18) of the first valve (3), and therefore a pressure built up in the first pressure chamber (14) closes the first valve (3), and the second valve (38) is open, and wherein, upon closure of the second valve (38), the first outflow opening (18) of the first valve (3) is opened, and therefore the pressure built up in the first pressure chamber (14) decreases, releasing the first valve (3), the second valve (38) has a second pressure chamber (40), which is connected to a second inflow (42) of the second valve (38) via a second filling opening (15) and is connectable to a second outflow (39) of the second valve (38) via a second outflow opening (18), the method further comprising, upon closure of the second valve (38), closing the second outflow opening (18) of the second valve (38) at about the same time as the first outflow opening (18) of the first valve (3) is opened, and therefore a pressure which builds up in the second pressure chamber (40) closes the second valve (38), and a control element (4) is guided in a movable manner through the valve element (20) of the first valve (3) or of the second valve (38).

* * * * *